US011987197B2

(12) United States Patent
Ishigaki et al.

(10) Patent No.: US 11,987,197 B2
(45) Date of Patent: May 21, 2024

(54) OCCUPANT PROTECTION DEVICE

(71) Applicant: Autoliv Development AB, Vargarda (SE)

(72) Inventors: Ryota Ishigaki, Kanagawa (JP); Yutaka Nakajima, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/250,462

(22) PCT Filed: Oct. 20, 2021

(86) PCT No.: PCT/JP2021/038685
§ 371 (c)(1),
(2) Date: Apr. 25, 2023

(87) PCT Pub. No.: WO2022/091889
PCT Pub. Date: May 5, 2022

(65) Prior Publication Data

US 2024/0001881 A1 Jan. 4, 2024

(30) Foreign Application Priority Data

Oct. 27, 2020 (JP) ................................ 2020-179688

(51) Int. Cl.
*B60R 21/207* (2006.01)
*B60R 21/235* (2006.01)
(Continued)

(52) U.S. Cl.
CPC .......... *B60R 21/207* (2013.01); *B60R 21/235* (2013.01); *B60R 21/239* (2013.01);
(Continued)

(58) Field of Classification Search
CPC ... B60R 21/207; B60R 21/235; B60R 21/239; B60R 21/264; B60R 2021/23509; B60R 2021/26029
See application file for complete search history.

(56) References Cited

U.S. PATENT DOCUMENTS 6,752,454 B2 * 6/2004 Ruel ..................... B60R 21/207
297/452.41
8,702,121 B2 * 4/2014 Yamashita ............ B60R 21/207
297/216.1
(Continued)

FOREIGN PATENT DOCUMENTS

JP 2006-327577 A 12/2006
JP 2007-118820 A 5/2007
(Continued)

*Primary Examiner* — Faye M Fleming
(74) *Attorney, Agent, or Firm* — Foley & Lardner LLP

(57) ABSTRACT

An occupant protection device capable of suppressing the occurrence of submarining and ensuring initial waist restraint performance. An occupant protection device provided inside or below a seat cushion of a vehicle seat, provided with:

- an airbag cushion capable of expanding and deploying to push up a seat surface of the seat cushion; and
- an inflator that supplies gas for expansion and deployment into the interior space of the airbag cushion during a vehicle emergency. The airbag cushion includes an expansion and deployment part that expands and deploys by gas from the inflator, and an exhaust vent part protruding from the peripheral edge of the airbag cushion. The expanded and deployed airbag cushion is configured such that the exhaust vent opens and allows the internal space of the expansion and deployment part to communicate with the outside when a load acts on the expansion and deployment part.

15 Claims, 13 Drawing Sheets

(51) Int. Cl.
*B60R 21/239* (2006.01)
*B60R 21/264* (2006.01)
*B60R 21/00* (2006.01)
*B60R 21/26* (2011.01)

(52) U.S. Cl.
CPC .... *B60R 21/264* (2013.01); *B60R 2021/0004* (2013.01); *B60R 2021/23509* (2013.01); *B60R 2021/26029* (2013.01)

(56) References Cited

U.S. PATENT DOCUMENTS

| | | | | |
|---|---|---|---|---|
| 8,888,126 B2 * | 11/2014 | Nukaya | B60N 2/42763 | 280/743.2 |
| 9,126,510 B2 * | 9/2015 | Hirako | B60N 2/42763 | |
| 9,428,137 B2 * | 8/2016 | Lee | B60N 2/42718 | |
| 11,865,987 B2 * | 1/2024 | Ishigaki | B60R 21/201 | |
| 2006/0267325 A1 * | 11/2006 | Kumagai | B60R 21/207 | 280/753 |
| 2013/0056964 A1 * | 3/2013 | Yamashita | B60N 2/42763 | 280/730.1 |

FOREIGN PATENT DOCUMENTS

| | | | |
|---|---|---|---|
| JP | 2008143255 A | * | 6/2008 |
| JP | 2011-93512 A | | 5/2011 |
| JP | 2013-29256 A | | 7/2013 |
| WO | 2012/081329 A1 | | 6/2012 |

* cited by examiner 90
105
110
32'

90
105
110
32'

1
100
107
105
110
24
26
32'

100
1
107
110
105
24
26
32"

110
105
32"

94
110
105
32"

OCCUPANT PROTECTION DEVICE

TECHNICAL FIELD

The present invention relates to an occupant protection device provided inside or below a seat cushion of a vehicle seat.

BACKGROUND ART

In general, a shoulder belt of a seat belt is stretched obliquely in front of a chest of an occupant seated on a vehicle seat, and a lap belt of the seat belt is stretched in front of a waist of the occupant. At the time of a vehicle collision, the seat belt restrains movement of the occupant. However, particularly at the time of a frontal collision of the vehicle, there is a possibility that a submarining phenomenon occurs in which the body of the occupant slips under the lap belt. Submarining is undesirable because the lap belt may compress the abdomen of the occupant.

As a countermeasure against this seatbelt submarining phenomenon, there is known an occupant protection device in which an airbag is provided inside a seat cushion of a vehicle seat. Patent Document 1 describes that in the event of such a frontal collision, a front end part of a seat cushion is raised by instantaneous expansion of an airbag in a vehicle seat, thereby restraining the waist of the occupant and suppressing forward movement of the waist of the occupant. In Patent Document 2, a vent hole is formed in the airbag.

PRIOR ART DOCUMENTS

Patent Documents

Patent Document 1: Japanese Unexamined Patent Application 2007-118820

Patent Document 2: Japanese Unexamined Patent Application 2006-327577

SUMMARY OF THE INVENTION

Problem to be Solved by the Invention

However, in Patent Document 1, the inside of the airbag is maintained at a high pressure while restraining the waist of the occupant, and the vicinity of the thighs of the occupant is continuously pushed up by the airbag. Therefore, depending on the sitting posture of the occupant, there is a possibility that the airbag raises the waist of the occupant and rotates the waist to the rear side. This is highly likely to occur particularly when the center of gravity of the body of the occupant is positioned further rearward, such as when the vehicle seat is in a reclining position (comfortable position). If such an event occurs, the lap belt of the seat belt may be removed from the ilium of the occupant, resulting in a submarining phenomenon.

On the other hand, in Patent Document 2, since the gas in the airbag escapes from the vent hole, the occurrence of the above-described event and the submarining phenomenon can be suppressed. However, there is a problem in that the gas in the airbag escapes before the waist of the occupant is sufficiently restrained, that is, the initial waist restraint performance is reduced.

An object of the present invention is to provide an occupant protection device capable of suppressing occurrence of a submarining phenomenon while ensuring initial waist restraint performance.

Means for Solving the Problem

An occupant protection device according to one aspect of the present invention is an occupant protection device provided inside or below a seat cushion of a vehicle seat, including:

- an airbag cushion that can be expanded and deployed so as to push the seat surface of the seat cushion up; and
- an inflator that supplies gas for expansion and deployment to the inside of the airbag cushion in an emergency. The airbag cushion includes an expansion and deployment part that is expanded and deployed by gas from the inflator and an exhaust vent part that is provided so as to protrude from a peripheral edge of the airbag cushion. The expanded and deployed airbag cushion is configured such that the exhaust vent part opens and allows the internal space of the expansion and deployment part to communicate with the outside when a load acts on the expansion and deployment part.

According to this aspect, for example, when the occupant is seated on the vehicle seat, the following operation is performed. In a vehicle emergency, the expansion and deployment part to which gas is supplied from the inflator is expanded and deployed to push up the seat surface of the seat cushion. In the initial stage of expansion and deployment, since the exhaust vent part is not opened, the internal pressure of the expansion and deployment part is maintained. Therefore, the initial waist restraint performance of the occupant can be improved. Following restraint, a load (for example, a reaction force from pushing upwards) acts on the expansion and deployment part. When the load is applied, the internal pressure of the expansion and deployment part becomes higher than that in the initial stage of expansion and deployment, the exhaust vent part that had been closed in the initial stage of expansion and deployment opens, and the internal pressure of the expansion and deployment part decreases. Therefore, further pushing up of the waist portion of the occupant is suppressed, and occurrence of the submarining phenomenon can be suppressed. In addition, soft restraint using a stroke (contraction accompanying a decrease in internal pressure) by the expansion and deployment part becomes possible.

In some aspects of the present invention, the airbag cushion may include a base fabric panel constituting the expansion and deployment part, and a base fabric panel extension part provided continuously from the base fabric panel and constituting the exhaust vent part. In addition, the base fabric panel extension part may include an upper extension panel and a lower extension panel facing each other in the up-down direction, and an exhaust port configured between the upper extension panel and the lower extension panel or formed in at least one of the upper extension panel and the lower extension panel. When the airbag cushion is expanded and deployed, the base fabric panel extension part may be configured such that the upper extension panel and the lower extension panel come into close contact with each other to close the exhaust port until a load acts on the expansion and deployment part, and the close contact between the upper extension panel and the lower extension panel is released to open the exhaust port when the load acts on the expansion and deployment part.

According to another aspect of the present invention, the exhaust vent part may include an exhaust port and a peripheral region of the exhaust port, and the expanded and deployed airbag cushion may be configured such that the peripheral regions come into close contact with each other to close the exhaust port until a load acts on the expansion and deployment part, and the close contact of the peripheral regions is released to open the exhaust port when the load acts on the expansion and deployment part.

In general, in an airbag cushion that is expanded and deployed, as the internal pressure increases, the membrane surface tension also increases. According to the above-described aspect, when the airbag cushion is expanded and deployed, before a load is applied, the expansion and deployment part is expanded and deployed from an initial stage of expansion and deployment to a subsequent stage of normal deployment (including a stage at which expansion and deployment is completed). The internal pressure at this stage maintains the exhaust vent part (the upper extension panel and the lower extension panel, or the peripheral region) in a close contact state or a state similar to close contact in a relative relationship with the membrane surface tension. In this manner, the exhaust port of the exhaust vent part is closed to ensure the initial waist restraint performance. On the other hand, when a load is applied, the internal pressure of the expansion and deployment part becomes higher than the internal pressure at the above-described stage. In the vicinity of the exhaust vent part, the membrane surface tension does not increase as much as that in other portions (portions to which the load is applied) (that is, the increase in the internal pressure is relatively larger than the increase in the membrane surface tension). Accordingly, the relative balance relationship between the internal pressure and the membrane surface tension is reversed, the close contact state or the state close to the close contact state is released, and the exhaust port of the exhaust vent part is opened. In this manner, the internal pressure of the expansion and deployment part decreases, and further pushing up of the waist of the occupant is suppressed.

EMBODIMENTS OF THE INVENTION

An occupant protection device according to preferred embodiments of the present invention will be described with reference to the accompanying drawings. In the present document, up and down, left and right, and front and rear are defined as follows. When an occupant is seated in a seat (vehicle seat) in a regular posture, a direction the occupant faces is referred to as the front, an opposite direction is referred to as the rear, and a direction indicating a coordinate axis is referred to as the front-to-back direction. Furthermore, when the occupant is seated in the vehicle seat in a regular posture, the right of the occupant is referred to as a right direction, the left of the occupant is referred to as a left direction, and a direction indicating a coordinate axis is referred to as the left-right direction. Similarly, when the occupant is seated in a regular posture, a head direction of the occupant is referred to as up, a waist direction of the occupant is referred to as down, and a direction indicating a coordinate axis is referred to as an up-down direction.

Figure 1A:
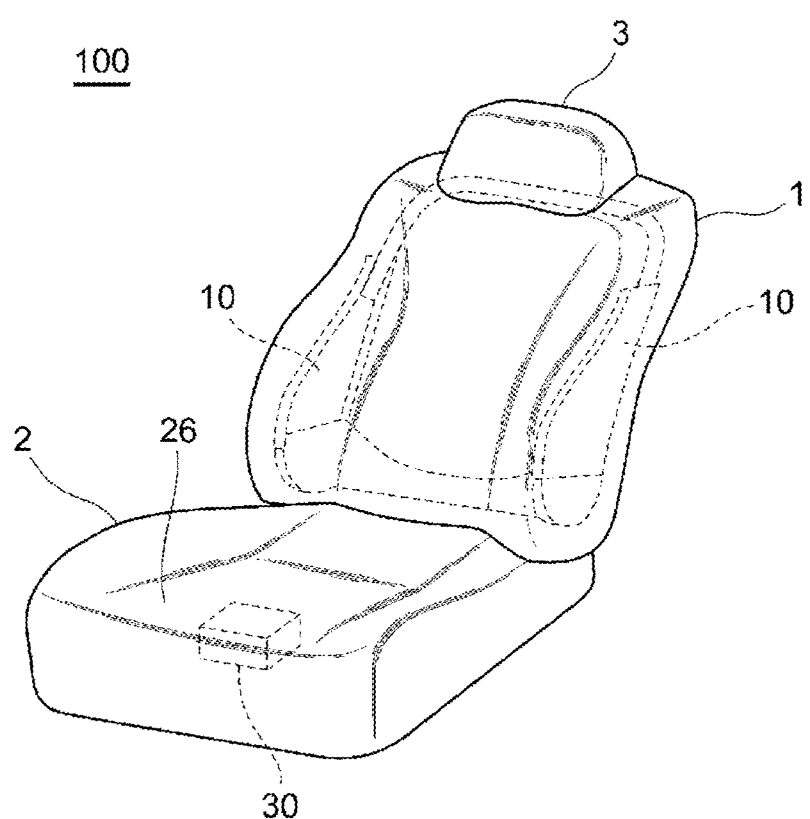
FIG. 1A is a perspective view illustrating an external shape of a vehicle seat provided with an occupant protection device according to an embodiment.
Figure 1B:
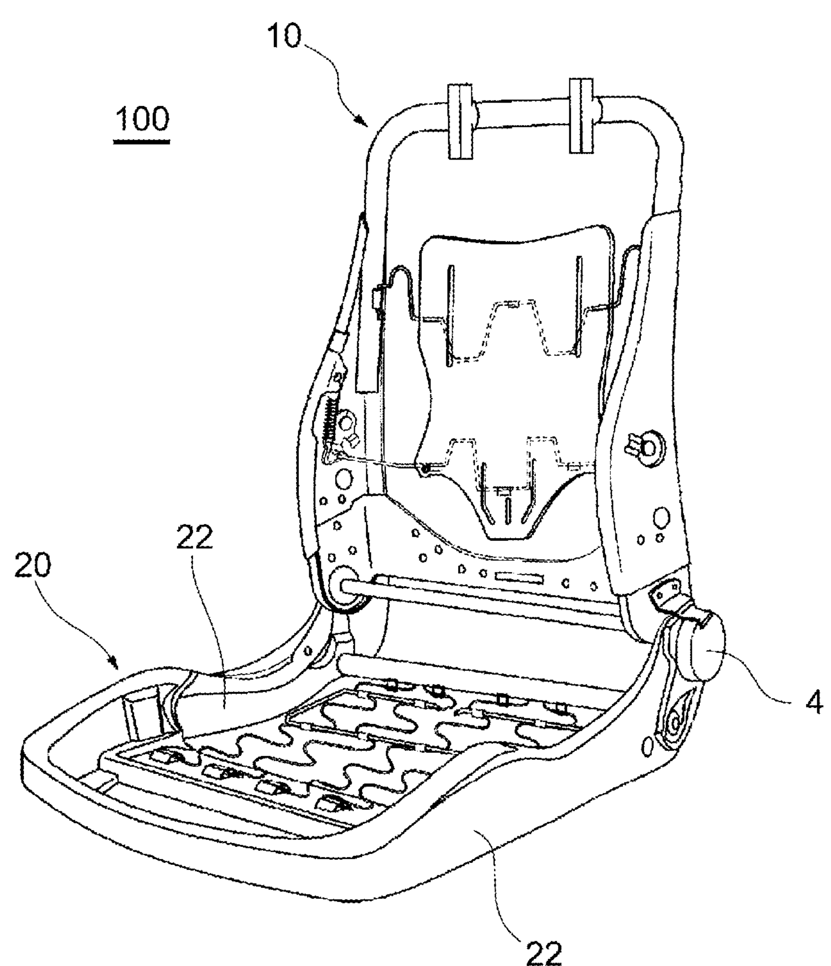
FIG. 1B is a perspective view illustrating a frame structure inside the vehicle seat of FIG. 1A.

As illustrated in FIGS. 1A and 1B, the vehicle seat 100 is provided with a seatback 1 that supports the back of an occupant, a seat cushion 2 on which the occupant is seated, and a headrest 3 that supports the head of the occupant. The vehicle seat 100 is, for example, a driver seat or passenger seat, but may be a rear seat.

A seat frame 10 and a seating frame 20, which form the framework of the seat, are provided inside the seat back 1 and the seat cushion 2, respectively. The seat frame 10 and the seating frame 20 are obtained by processing a metal component or hard resin, and are mutually connected via a reclining mechanism 4. The seating frame 20 has a pair of side frames 22 and 22 spaced apart on the left and right, and a seat pan 24 (see FIG. 3) is bridged between the pair of side frames 22 and 22. The seat cushion 2 has, for example, a seat pad made of a urethane foam material or the like covering a surface and perimeter of the seating frame 20, and a seat cover made of leather, fabric or the like covering a surface of the seat pad. An upper surface of the seat cover constitutes a surface on which the occupant sits, in other words, a seat surface 26 of the seat cushion 2.

The occupant protection device 30 is provided inside or below the seat cushion 2. For example, the occupant protection device 30 is provided inside the seat cushion 2 and is covered by the seat cover. In this case, the occupant protection device 30 may be provided on an upper surface of the seat pan 24. Alternatively, if the seat pan 24 is not provided, placing in the seating frame 20 is possible. In another example, the occupant protection device 30 is provided below the seat cushion 2 instead of inside the seat cushion 2. In this case, for example, the occupant protection device 30 is mounted on a bracket secured to the vehicle seat 100 below the seat cushion 2. Hereinafter, an example in which the occupant protection device 30 is provided on the upper surface of the seat pan 24 will be described.

Figure 2:
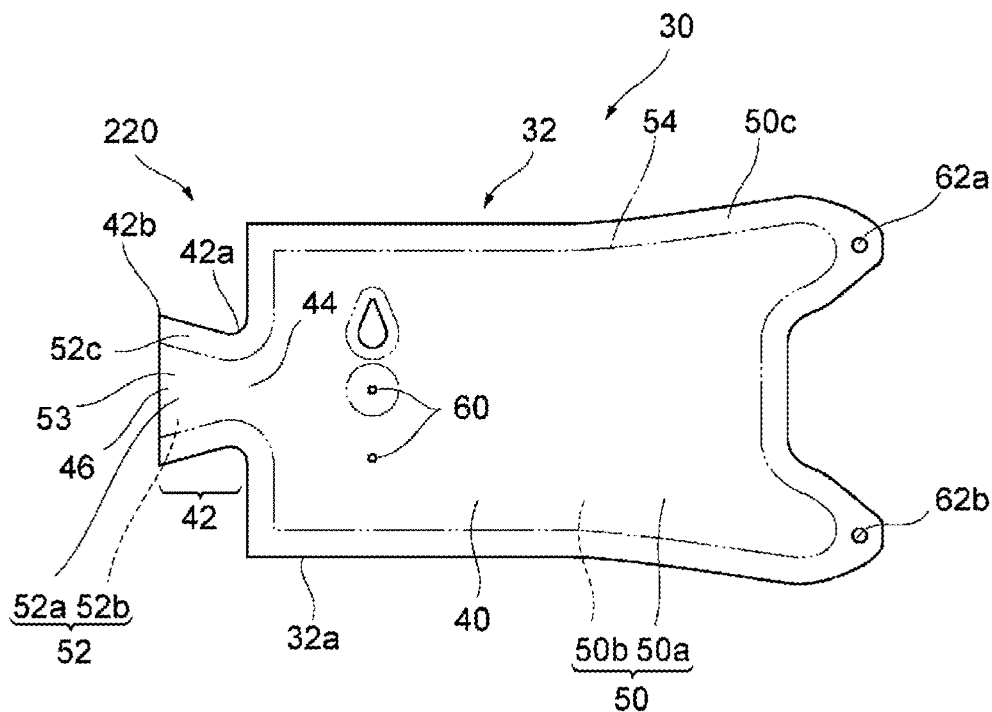
FIG. 2 is a plan view illustrating an airbag cushion of the occupant protection device according to the embodiment prior to installation on the seat pan of a vehicle seat.
Figure 3:
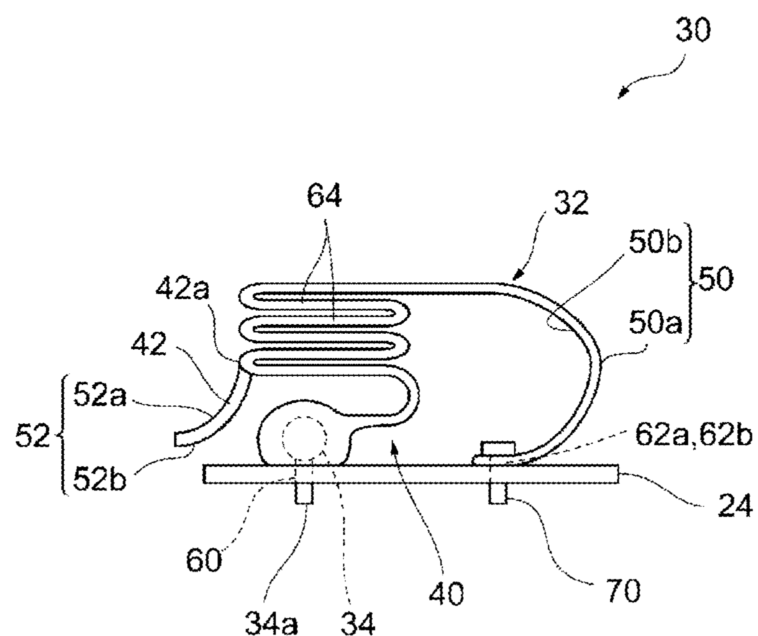
FIG. 3 is a cross-sectional view illustrating the occupant protection device according to the embodiment after installation on the seat pan of a vehicle seat.

As illustrated in FIGS. 2 and 3, the occupant protection device 30 is provided with an airbag cushion 32 capable of expansion and deployment, and an inflator 34 that supplies gas for expansion and deployment to the interior of the airbag cushion 32 in the event of a vehicle emergency. An example of a vehicle emergency is a frontal collision of a vehicle. Note that in FIG. 2, the inflator 34 is omitted.

The inflator 34 is electrically connected to a vehicle side ECU. For example, the inflator 34 receives a signal that an impact upon a frontal collision of the vehicle has been detected from the vehicle side ECU and operates to instantly supply the gas to the airbag cushion 32. The inflator 34 can be one of various types of inflators, such as inflators filled with a gas generating agent, compressed gas, or both, and the like. By way of example, the inflator 34 has an igniting device at an open end part of a cylindrical body with a bottom. Furthermore, when a gas generating agent in the cylindrical body is ignited using the igniting device, gas is generated, and the gas for expansion and deployment is supplied into the airbag cushion 32 from a plurality of injection holes located on a peripheral surface of the cylindrical body.

The airbag cushion 32 includes an expansion and deployment part 40 that is expanded and deployed by gas from the inflator 34, and an exhaust vent part 42 that is provided so as to protrude from a peripheral edge **32*a* of the airbag cushion 32**.

The expansion and deployment part 40 constitutes most of the airbag cushion 32. The volume of the expansion and deployment part 40 when expanded and deployed is, for example, about four to six liters. The exhaust vent part 42 is continuous with the expansion and deployment part 40 so as to protrude from one end part of the expansion and deployment part 40. Here, the exhaust vent part 42 is positioned on the front side in the front-to-back direction of the vehicle seat 100, and is provided so as to protrude forward from the central portion of the front end part of the expansion and deployment part 40. However, in other embodiments, the exhaust vent part 42 may protrude from other positions of the expansion and deployment part 40, such as being positioned on the rear side in the front-to-back direction of the vehicle seat 100.

The insides of the expansion and deployment part 40 and the exhaust vent part 42 communicate with each other. The inside of the expansion and deployment part 40 is a closed space except for a communication point 44 with the inside of the exhaust vent part 42. The exhaust vent part 42 has an exhaust port 46 that allows the inside of the exhaust vent part 42 to communicate with the outside. The exhaust port 46 is located, for example, on the opposite side of the communication point 44 in the exhaust vent part 42. The exhaust port 46 is always open. As will be described later, the exhaust port 46 is configured to be closed at the initial stage of a vehicle emergency and then opened.

The exhaust vent part 42 is configured such that a root part **42*a* on the peripheral edge 32*a* side of the airbag cushion 32 is narrower than a tip end part 42*b* of the exhaust vent part 42. To support this manner of configuration, the length in the left-right direction is shorter at the root part 42*a* than at the tip end part 42*b* inside the exhaust vent part 42. Here, the exhaust vent part 42 is configured to be gradually narrowed from the tip end part 42*b* to the root part 42*a*, and correspondingly, the inside of the exhaust vent part 42 is also gradually narrowed from the tip end part 42*b* to the root part 42*a*. The communication point 44 is located at the root part 42*a*, and the exhaust port 46 is located at the tip end part 42*b***.

The airbag cushion 32 includes a base fabric panel 50 constituting the expansion and deployment part 40 and a base fabric panel extension part 52 constituting the exhaust vent part 42. The base fabric panel extension part 52 is provided continuously from the base fabric panel 50. The base fabric panel extension part 52 is formed such that a tip end part of the base fabric panel extension part 52 is wider than the vicinity of a boundary with the base fabric panel 50. This is related to the configuration in which the root part **42*a* is narrower than the tip end part 42*b* in the exhaust vent part 42** as described above.

Here, from another viewpoint, it can be understood that the airbag cushion 32 has a constricted structure 220 in the middle of the base fabric panel extension part 52. The phrase, "in the middle of the base fabric panel extension part 52" means an intermediate portion or an end part of the base fabric panel extension part 52. In the constricted structure, for example, as illustrated in FIG. 2, a portion in the longitudinal direction (here, the front-to-back direction) of the airbag cushion 32 in a planarly deployed state is a portion (constricted portion) that is narrower than the other portions. Here, the constricted structure 220 is provided such that a constricted portion is formed at the root part **42*a* of the exhaust vent part 42, that is, at the end part of the base fabric panel extension part 52**.

The base fabric panel 50 includes an upper base fabric panel **50*a* and a lower base fabric panel 50*b* that face each other in the up-down direction. Similarly, the base fabric panel extension part 52 includes an upper extension panel 52*a* and a lower extension panel 52*b* that face each other in the up-down direction. The upper extension panel 52*a* is provided continuously from the upper base fabric panel 50*a*, and the lower extension panel 52*b* is provided continuously from the lower base fabric panel 50*b*. In addition, the exhaust port 46 is formed between the upper extension panel 52*a* and the lower extension panel 52*b*. In other words, in the exhaust vent part 42, the peripheral region 53 of the exhaust port 46 is constituted by the upper extension panel 52*a* and the lower extension panel 52*b***.

Each of the upper base fabric panel 50*a* and the lower base fabric panel 50*b* may be a panel divided into two sheets (each of which is a single individual panel), or may be formed by folding a single panel and vertically overlapping the folded panel. The same applies to the upper extension panel 52*a* and the lower extension panel 52*b*.

An example in which one panel is folded back will be described. First, a single panel made of nonwoven fabric or the like is folded back at the longitudinal central portion thereof, and the folded parts are overlapped vertically. Furthermore, when superimposed, the upper base fabric panel 50*a* and the upper extension panel 52*a*, which form the upper part, and the lower base fabric panel 50*b*, and the lower extension panel 52*b*, which form the lower part, and the peripheries 50*c* and 52*c* are sewn with a seam 54. However, sewing is not performed at the position of the exhaust port 46. By such sewing, an air chamber is defined inside between the upper base fabric (upper base fabric panel 50*a* and upper extension panel 52*a*) and the lower base fabric (lower base fabric panel 50*b* and lower extension panel 52*b*) on the inner side of the seam 54. By supplying gas from the inflator 34 to the air chamber, the expansion and deployment part 40 is inflated and deployed in a bag shape.

The airbag cushion 32 has, for example, a front attachment point 60 and rear attachment points 62*a* and 62*b* as attachment points to the seat pan 24 of the vehicle seat 100. The front attachment point 60 may also serve as an attachment point for attaching the inflator 34 to the vehicle seat 100 side. For example, when the aforementioned cylindrical body with a bottom is used as the inflator 34, an axial direction of the cylindrical body is aligned with the left-right direction, and the cylindrical body is stowed inside the expansion and deployment part 40. A pair of left and right stud bolts 34*a* projecting from the outer periphery of the cylindrical body protrude outside the airbag cushion 32 (below the lower base fabric panel 50*b*) and are fastened and secured to the seat pan 24 with nuts. Thereby, the inflator 34 and the airbag cushion 32 are co-fastened to the seat pan 24 by the stud bolts 34*a* and nuts. This co-fastening constitutes the front attachment point 60.

The rear attachment points 62*a* and 62*b* are attached to the rear side of the front attachment point 60 in the front-to-back direction of the vehicle seat 100. The rear attachment points 62*a* and 62*b* are provided at the rear corner portions of the peripheral edge 32*a* of the airbag cushion 32 and are separated from each other in the left-right direction. The rear attachment points 62*a* and 62*b* are, for example, holes in which fasteners 70 are used. The rear attachment points 62*a* and 62*b* are formed on the periphery 50*c* of the upper base fabric panel 50*a* and the lower base fabric panel 50*b*, and are located outside the seam 54. Therefore, the rear attachment points 62*a* and 62*b* are provided on a non-expanding and deploying portion of the airbag cushion 32, not on the expansion and deployment part 40.

At least a part of the airbag cushion 32 attached to the seat pan 24 is folded in a state before expansion and deployment. For example, the expansion and deployment part 40 is folded between the front attachment point 60 and the rear attachment points 62*a* and 62*b*. As an example, the expansion and deployment part 40 includes, on the front side, a plurality of fold-back parts 64 that are folded in an accordion shape to overlap each other in the up-down direction. In another embodiment, the expansion and deployment part 40 may be folded in a form (for example, a roll form) other than the accordion form, or may be a combination of a plurality of forms. The exhaust vent part 42 may be provided so as to hang down on the front side of the fold-back part 64, or may be provided so as to be folded.

Figure 3A:
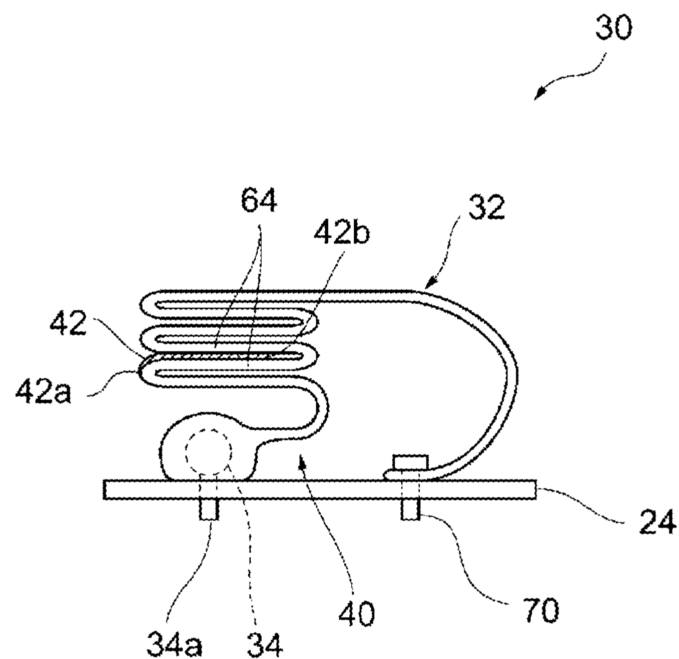
FIG. 3A is a cross-sectional view of an occupant protection device according to a modified example of the embodiment, illustrating a state in which an exhaust vent part is interposed between folded layers of a folded expansion and deployment part.

Alternatively, as in a modified example illustrated in the FIG. 3A, the exhaust vent part 42 may be interposed between the folded layers of the folded expansion and deployment part 40. For example, the exhaust vent part 42 may be folded rearward with the root part 42*a* as a starting point, and the tip end part 42*b* may be inserted between the plurality of fold-back parts 64 of the expansion and deployment part 40. Other ways of providing the exhaust vent part 42 will be described later with reference to FIGS. 9 and 10. In the mounted state of the airbag cushion 32, the upper extension panel 52*a* and the lower extension panel 52*b* are in contact with each other on their inner surfaces.

Note that in another embodiment, the front attachment point 60 may also be a hole where a fastener is used, similar to the rear attachment points 62*a* and 62*b*. Further, the inflator 34 may be attached to the rear side of the airbag cushion 32 so as to be away from the exhaust port 46. This enables suppressing the gas from the inflator 34 from leaking from the exhaust port 46 in the initial stage in which the inflator 34 is activated.

Figure 4A:
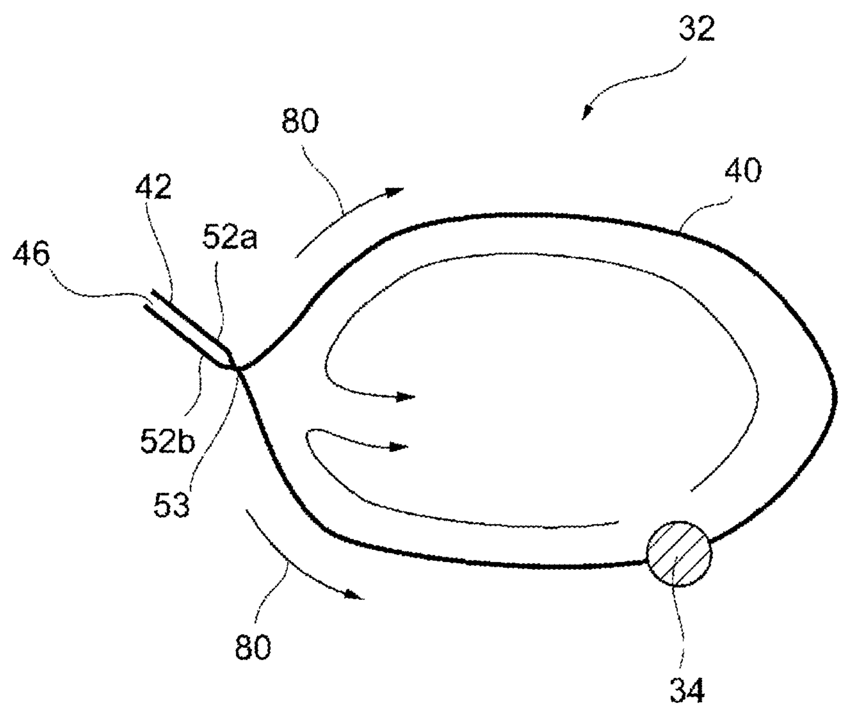
FIG. 4A is a schematic cross-sectional view illustrating the state of the airbag cushion of the occupant protection device according to an embodiment expanded and deployed with a load acting on the expansion and deployment part.
Figure 4B:
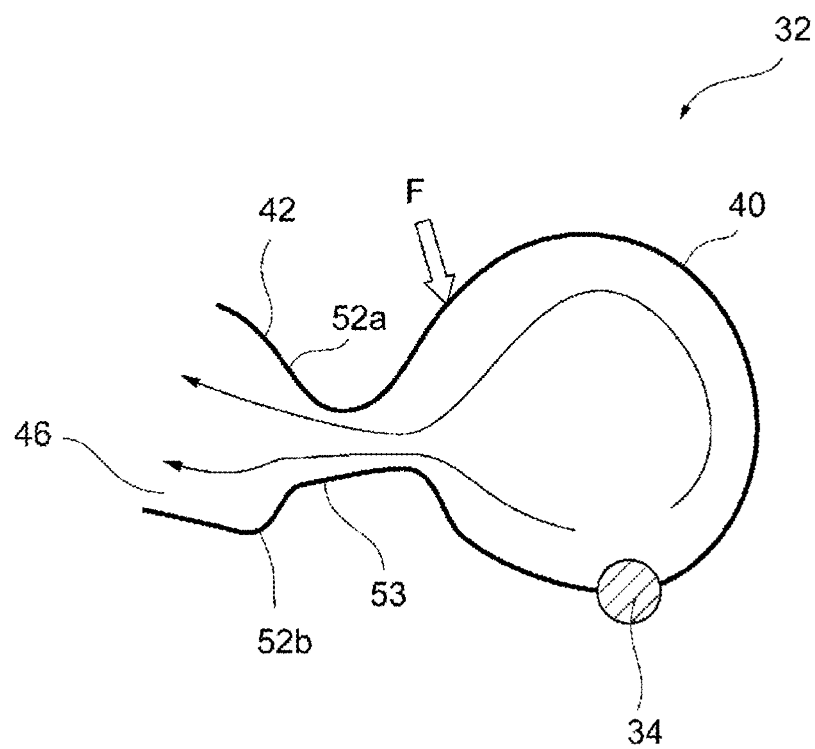
FIG. 4B is a schematic cross-sectional view illustrating the state of the airbag cushion of the occupant protection device according to an embodiment expanded and deployed with a load acting on the expansion and deployment part.

Next, the state transition of the expanded and deployed airbag cushion 32 will be described with reference to FIGS. 4A and 4B. FIG. 4A illustrates the state of the expansion and deployment part 40 after being expanded and deployed until a load is applied. FIG. 4B illustrates a state in which a load acts on the expansion and deployment part 40 after being expanded and deployed.

As illustrated in FIG. 4A, when the airbag cushion 32 receives gas supplied from the inflators 34, the expansion and deployment part 40 deploys and expands upward such that the fold line of the fold-back part 64 is released. In the expanded and deployed airbag cushion 32, as illustrated by an arrow 80, the expansion and deployment part 40 is pulled by the internal pressure, membrane surface tension is generated, and the airbag cushion 32 rises. Thus, the exhaust port 46 becomes obstructed. That is, the internal pressure of the airbag cushion 32 brings the upper extension panel 52*a* and the lower extension panel 52*b* (the peripheral regions 53 of the exhaust port 46) into close contact with each other in a relative relationship with the increased membrane surface tension, thereby obstructing the exhaust port 46. This prevents the gas in the expansion and deployment part 40 from leaking from the exhaust vent part 42.

As illustrated in FIG. 4B, when a load F acts on the expansion and deployment part 40, the expansion and deployment part 40 deforms. For example, when the load F acts from the outside of the expansion and deployment part 40 toward the inside of the expansion and deployment part 40, the internal pressure of the expansion and deployment part 40 becomes higher than that at the initial stage of expansion and deployment, while the membrane surface tension in the vicinity of the exhaust vent part 42 does not increase as much, thereby opening the exhaust vent part 42 which was in a close contact state at the initial stage of expansion and deployment. That is, the close contact between the upper extension panel 52*a* and the lower extension panel 52*b* (the peripheral regions 53 of the exhaust port 46) is released, and the exhaust port 46 is opened. As a result, the inside of the expansion and deployment part 40 communicates with the outside, and the gas inside the expansion and deployment part 40 leaks from the exhaust vent part 42.

The principle of opening the exhaust vent part 42 will be described in more detail below. In general, in an airbag cushion that inflates uniformly, the membrane surface tension increases as the internal pressure increases. The membrane surface tension varies depending on the radius of curvature and the degree of deformation of the airbag cushion itself (for example, the direction of the membrane surface tension varies vertically and horizontally between before and after restraint due to deformation of the airbag cushion). The position of the exhaust vent part 42 is separated from the position on which the load F acts, and at this position, the deformation of the airbag cushion itself due to the load F is small and the radius of curvature does not change greatly. Therefore, even when the load F is applied, it is thought that the membrane surface tension does not become as large in the exhaust vent part 42 as compared with the other portion (the portion on which the load F acts). On the other hand, in the expansion and deployment part 44, the internal pressure increases due to gas from the inflator 34, deformation of the bag due to the load F, and the like.

Here, the relationship with internal pressure from the initial stage of expansion and deployment before the load F is applied to the time thereafter when normal deployment progresses is relative to the membrane surface tension, and the exhaust vent part 42 is maintained in close contact or a state similar to close contact. As a result, the exhaust port 46 of the exhaust vent part 42 is obstructed. Thereafter, when the load F acts, the internal pressure of the expansion and deployment part 44 further increases. On the other hand, in the vicinity of the exhaust vent part 42, the membrane surface tension does not increase as much as that in other portions (portions on which the load F acts) (that is, the increase in the internal pressure is relatively larger than the increase in the membrane surface tension). As a result, the exhaust port 46 of the exhaust vent part 42, which had been closed in a close contact state from the initial stage of deployment due to the balance relationship of the internal pressure during expansion and the membrane surface tension, is opened. That is, by the application of the load F, the relative balance relationship between the internal pressure and the membrane surface tension is reversed in the vicinity of the exhaust vent part 42, the close contact state or the state similar to the close contact state is released, and the exhaust port 46 is opened.

Here, the load F may include, for example, a reaction force generated when the expanded and deployed airbag cushion 32 pushes up the seat surface 26 when the occupant is seated on the vehicle seat 100. The expanded and deployed expansion and deployment part 40 pushes up the seat surface 26, thereby lifting the thigh of the occupant (for example, the vicinity of the thigh close to the buttocks of the occupant). When the expansion and deployment part 40 presses the thighs of the occupant via the seat surface 26, a force due to the weight of the seat cushion 2 and the occupant and an inertial force that causes the occupant to move forward act on the expansion and deployment part 40 as a reaction force of this pushing. The force acting herein can be defined as a load F for opening the exhaust port 46. On the other hand, when the occupant is not seated on the vehicle seat 100, the load F does not act on the expansion and deployment part 40. Therefore, it can be understood that a condition for opening the exhaust vent part 42 includes when the thigh of the occupant is pressed (when the waist is restrained) and the occupant moves during a vehicle emergency.

Figure 5:
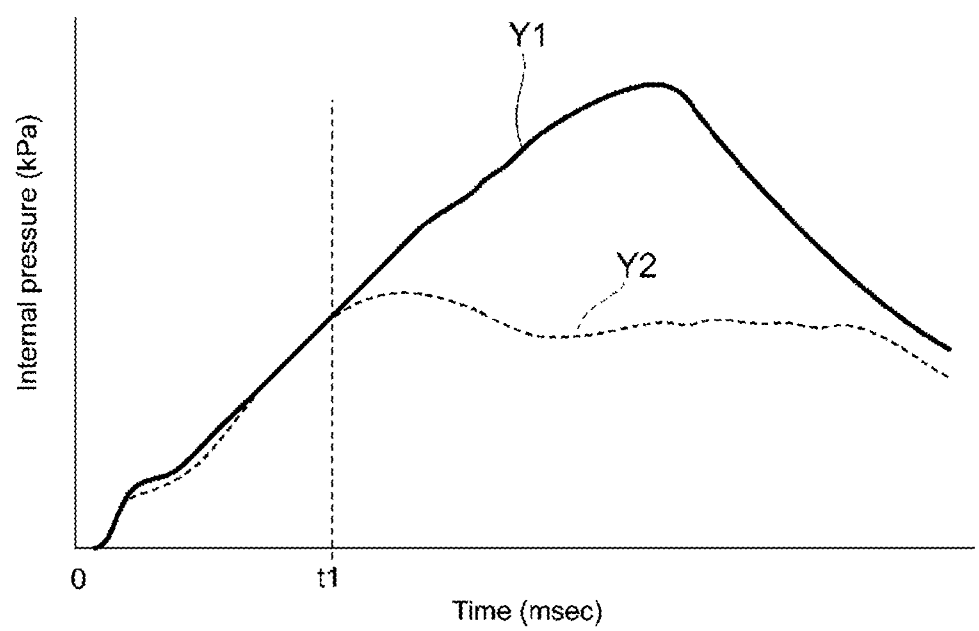
FIG. 5 is a graph illustrating changes in the internal pressure of the airbag cushion of each of the occupant protection devices according to the embodiment and the occupant protection device according to a comparative example.

FIG. 5 is a graph illustrating a change in the internal pressure of the airbag cushion with respect to time when an occupant is seated on the vehicle seat. The curve Y1 relates to the airbag cushion according to the comparative example not having the exhaust vent part 42, and the curve Y2 relates to the airbag cushion 32 according to the embodiment having the exhaust vent part 42. Time t1 indicates the time at which the expanded and deployed airbag cushion presses the thigh region of the occupant (when the waist is restrained). The time t1 is, for example, 15 msec from the start of expansion and deployment of the airbag cushion. Until time t1, in the comparative example and the embodiment, the internal pressure continues to rise in a similar manner.

In the comparative example indicated by the curve Y1, the internal pressure of the airbag cushion continues to increase even after the time t1, and then reaches a peak. Therefore, the airbag cushion of the comparative example continues to push up the thigh of the occupant with a higher internal pressure even after restraining the waist of the occupant.

On the other hand, in the embodiment indicated by the curve Y2, an increase in the internal pressure of the airbag cushion 32 is suppressed after the time t1, and the internal pressure tends to decrease. This is because the exhaust port 46 is opened at the time t1. Therefore, the airbag cushion 32 of the embodiment can perform the same initial waist restraint as that of the airbag cushion of the comparative example, and can continue the waist restraint at a lower internal pressure than that of the airbag cushion of the comparative example after restraining the waist.

Figures 6A, 6B, 6C:
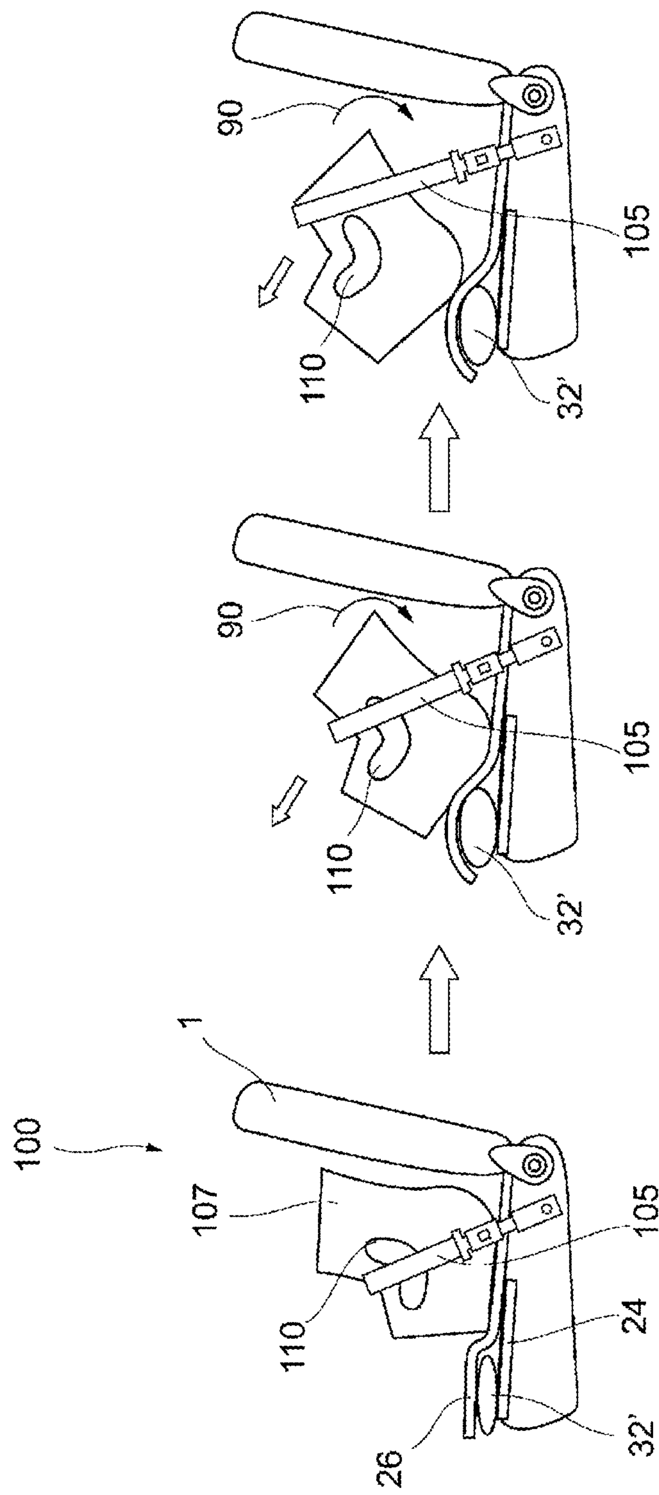
FIGS. 6(*a*) to 6(*c*) are schematic views illustrating a relationship between an occupant protection device according to a comparative example (without an exhaust vent part) and an occupant, in which FIG. 6(*a*) illustrates a normal state, FIG. 6(*b*) illustrates an initial stage of a vehicle emergency (at the time of restraint), and FIG. 6(*c*) illustrates a middle stage or a late stage of the vehicle emergency (after restraint).
Figures 7A, 7B, 7C:
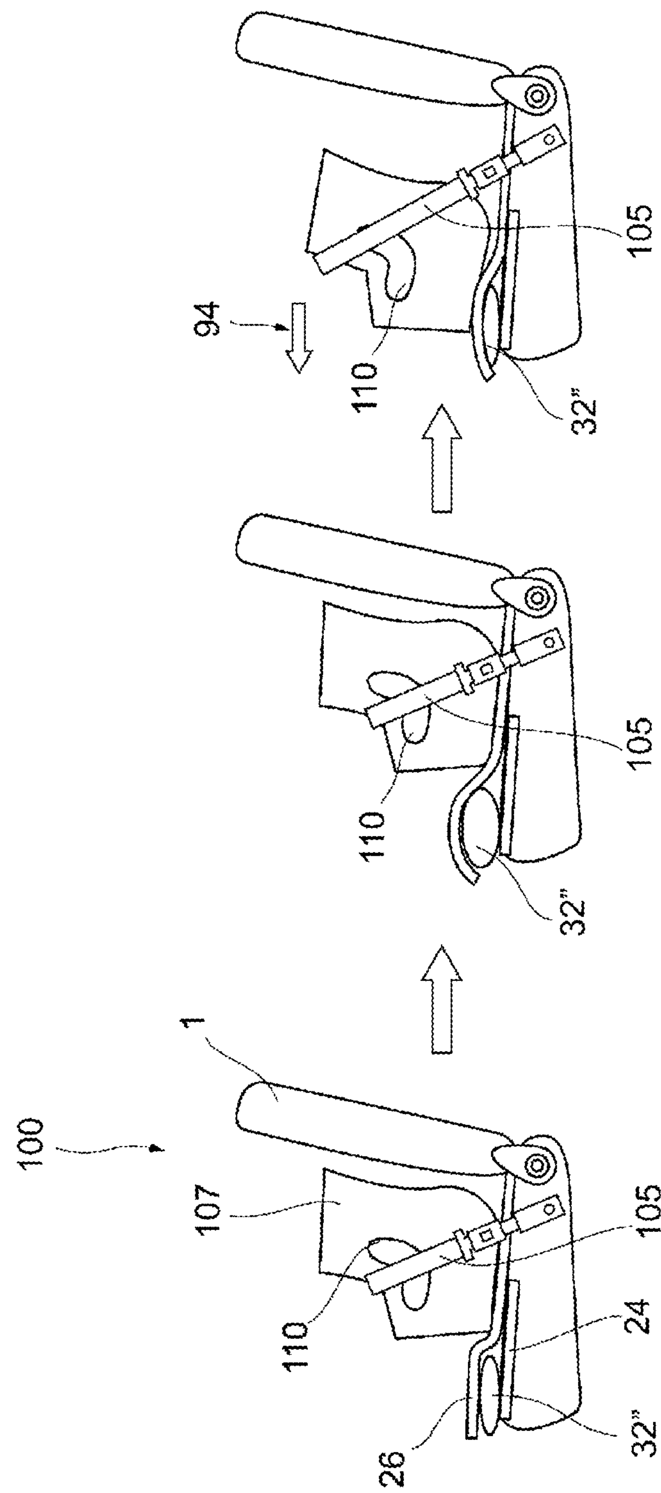
FIGS. 7(*a*) to 7(*c*) are schematic views illustrating a relationship between an occupant protection device according to another comparative example (with a round vent hole) and an occupant, in which FIG. 7(*a*) illustrates a normal state, FIG. 7(*b*) illustrates an initial stage of a vehicle emergency (at the time of restraint), and FIG. 7(*c*) illustrates a middle stage or a late stage of the vehicle emergency (after restraint).
Figures 8A, 8B, 8C:
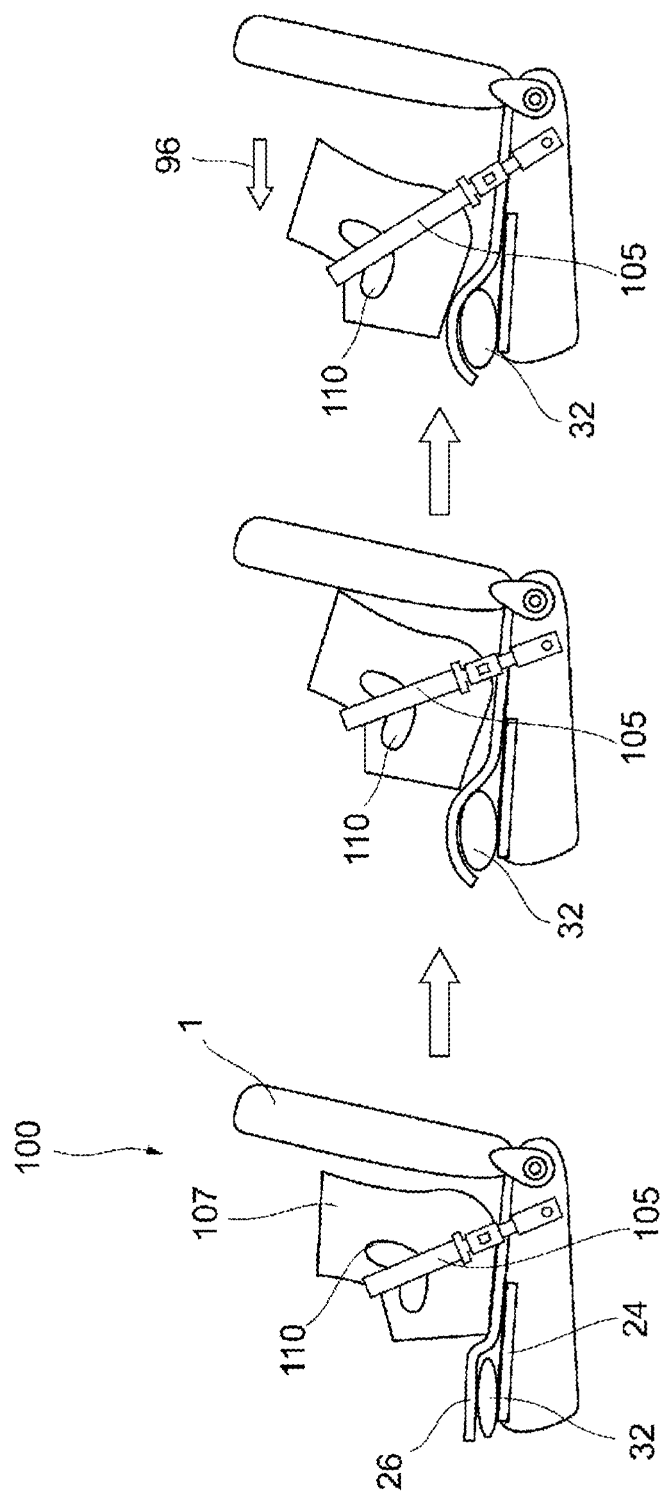
FIGS. 8(*a*) to 8(*c*) are schematic views illustrating a relationship between the occupant protection device according to the embodiment and an occupant, in which FIG. 8(*a*) illustrates a normal state, FIG. 8(*b*) illustrates an initial stage (at the time of restraint) in a vehicle emergency, and FIG. 8(*c*) illustrates a middle stage or a late stage (after restraint) in the vehicle emergency.

Next, with further reference to FIGS. 6 to 8, operation of the occupant protection device 30 according to an embodiment in a vehicle emergency will be described while comparing with passenger protection devices according to two comparative examples. FIG. 6 relates to an airbag cushion 32' according to a comparative example having no exhaust vent part 42 (or in other words, an airbag cushion indicating the curve Y1 in FIG. 5). FIG. 7 relates to an airbag cushion 32" according to another comparative example having a round vent hole in the expansion and deployment part instead of the exhaust vent part 42 (or in other words, an airbag cushion having a circular exhaust port formed in a part of the expansion and deployment part). FIG. 8 relates to the airbag cushion 32 according to the embodiment. In each diagram, (a) illustrates a normal state, (b) illustrates an initial stage of a vehicle emergency (when the waist is restrained), and (c) illustrates a middle stage or a late stage of the vehicle emergency (after restraint).

First, in the comparative example in which the exhaust vent part 42 is not provided, as illustrated in FIG. 6(*b*), the expanded and deployed airbag cushion 32' pushes up the thigh of the occupant 107 via the seat surface 26, and restrains the waist of the occupant 107. Under restraint of the lumbar region of the occupant 107, however, the airbag cushion 32' is maintained at a high pressure and continues to push up the thighs of the occupant 107. As a result, the airbag cushion 32' may lift and rotate the waist of the occupant 107 rearward, as indicated by an arrow 90. Then, as illustrated in FIG. 6(*c*), the lap belt 105 of the seat belt may come off the ilium 110 of the occupant 107, and a submarining phenomenon may occur in which the body of the occupant 107 slips under the lap belt 105.

In another comparative example having a round vent hole, as illustrated in FIG. 7(*b*), the expanded and deployed airbag cushion 32" pushes up the thigh of the occupant 107 via the seat surface 26, but the push-up force is weaker than that of the comparative example of FIG. 6. This is because in the comparative example illustrated in FIG. 7, the gas inside the airbag cushion 32" leaks from the round vent hole after the start of expansion and deployment, and the internal pressure is not maintained. Therefore, the initial restraining force of the waist portion of the occupant 107 is low, and as indicated by an arrow 94 in FIG. 7(*c*), forward movement of the occupant 107 cannot be sufficiently restrained.

On the other hand, in the embodiment illustrated in FIG. 8, since the exhaust vent part 42 is closed until the waist of the occupant 107 is restrained, the initial restraint of the waist of the occupant 107 is performed in the same manner as in the comparative example illustrated in FIG. 6 (see FIG. 8(*b*)). Since the exhaust vent part 42 is opened after the waist portion of the occupant 107 is restrained, the restraint of the waist portion of the occupant is alleviated as compared with the comparative example illustrated in FIG. 6. Accordingly, rotating the waist of the occupant 107 rearward by the airbag cushion 32 is suppressed. As a result, as illustrated in FIG. 8(*c*), this enables maintaining a state in which the lap belt 105 stays on the ilium 110 of the occupant 107. In addition, forward movement of the occupant 107 indicated by an arrow 96 is suppressed. While restraining the waist as illustrated in FIG. 8(*c*), soft restraint is achieved by using a stroke (deflation accompanying a decrease in internal pressure) of the expansion and deployment part 40.

As described above, the occupant protection device 30 according to the embodiment includes the airbag cushion 32 and the inflator 34, and the airbag cushion 32 includes the expansion and deployment part 40 which is expanded and deployed by the gas from the inflator 34 and the exhaust vent part 42 which is provided so as to protrude from the peripheral edge 32*a* of the airbag cushion 32. The expanded and deployed airbag cushion 32 is configured such that the exhaust vent part 42 opens and allows the internal space of the expansion and deployment part 40 to communicate with the outside when a load F acts on the expansion and deployment part 40.

According to this manner of configuration, in a vehicle emergency, the expansion and deployment part 40 to which gas is supplied from the inflator 34 is expanded and deployed to push up the seat surface of the seat cushion 2. In the initial stage of the expansion and deployment, since the exhaust vent part 42 is not opened, the internal pressure of the expansion and deployment part 40 is maintained. Therefore, the initial waist restraint performance of the occupant can be improved. Then, the load F acts on the expansion and deployment part 40 due to the restraint of the waist portion. When the load F is applied, the internal pressure of the expansion and deployment part 40 becomes higher than that in the initial stage of expansion and deployment, and the exhaust vent part 42, which is in a close contact state in the initial stage of expansion and deployment, is opened. As a result, the internal pressure of the expansion and deployment part 40 decreases. Therefore, further pushing up of the waist portion of the occupant can be suppressed, and the submarining phenomenon can be suppressed from occurring.

As described above, according to the embodiment, it is possible to provide the occupant protection device 30 including the airbag cushion 32 with the self-adaptive exhaust vent part 42, and it is possible to achieve suppressing the submarining phenomenon from occurring and securing initial waist restraint performance.

In particular, the exhaust vent part 42 is configured such that the root part 42*a* is narrower than the tip end part 42*b*. Therefore, in a vehicle emergency, it is possible to increase the occlusivity of the exhaust vent part 42 until the load F is applied to the expansion and deployment part 40.

In addition, according to the modified example illustrated FIG. 3A, since the exhaust vent part 42 is interposed between the folded layers of the folded expansion and deployment part 40, it is possible to further suppress the leakage of the gas from the exhaust port 46 of the exhaust vent part 42 at the initial stage of the expansion and deployment of the airbag cushion 32. Specifically, in the initial stage of expansion and deployment, a prescribed time is required until the membrane surface tension is increased, although the time is slight, and gas may leak from the exhaust port 46 during this prescribed time. However, by arranging the exhaust vent part 42 as described above, the flow of the gas toward the exhaust vent part 42 is structurally suppressed in the initial stage of expansion and deployment. Therefore, gas leakage at the initial stage of expansion and deployment is suppressed, and the initial waist restraint performance can be further improved.

Next, other embodiments will be described. The other embodiments will be described with a focus on differences from the above-described embodiment, and description of configurations and operations common to the above-described embodiment will be omitted.

Figure 9:
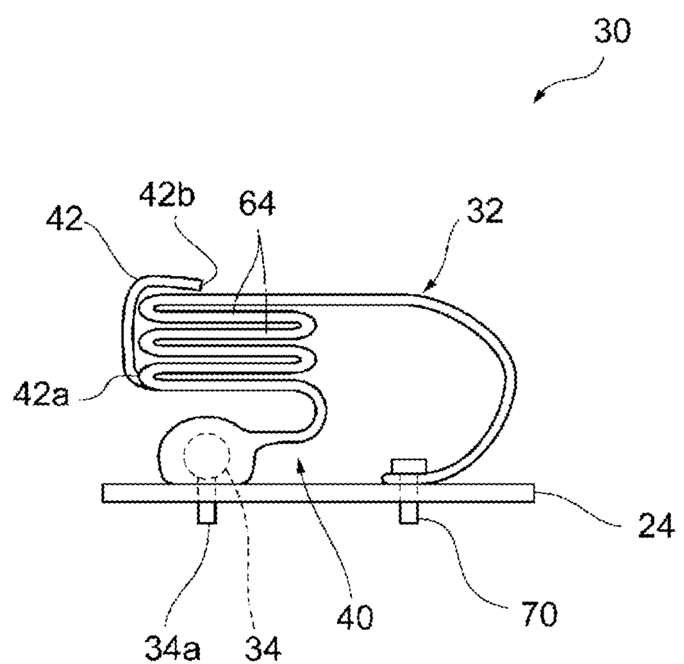
FIG. 9 is a cross-sectional view of the occupant protection device according to Embodiment 2.

In the occupant protection device 30 according to Embodiment 2 illustrated in FIG. 9, in the airbag cushion 32 attached to the seat pan 24 before expansion and deployment, the exhaust vent part 42 is folded as to be overlapping the upper part of the folded expansion and deployment part 40. For example, the exhaust vent part 42 is folded upward with the root part 42*a* as a starting point, faces the front portions of the plurality of fold-back parts 64 of the expansion and deployment part 40, is then folded rearward so as to be placed on the upper portion of the uppermost folded part 64, and faces rearward in a state in which the tip end part 42*b* overlaps the upper portion of the uppermost fold-back part 64.

Figure 10:
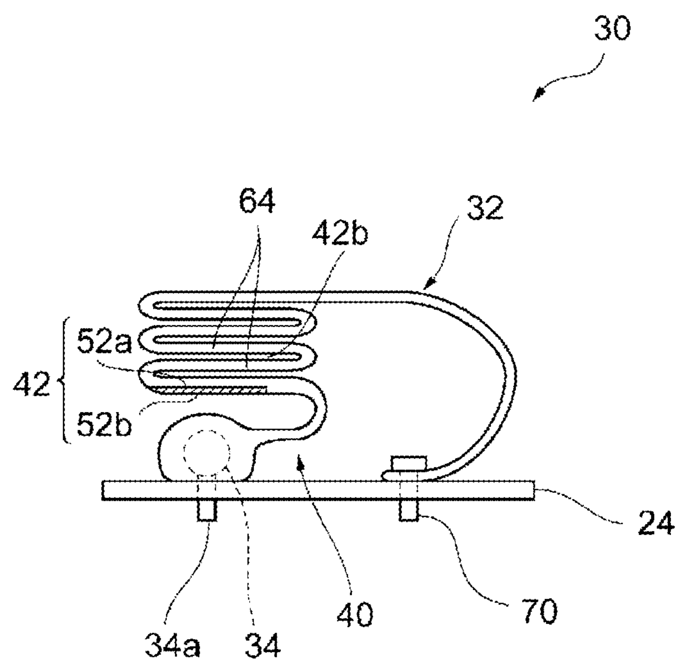
FIG. 10 is a cross-sectional view of the occupant protection device according to Embodiment 3.

In the occupant protection device 30 according to Embodiment 3 illustrated in FIG. 10, in the airbag cushion 32 attached to the seat pan 24 before expansion and deployment, the exhaust vent part 42 is tucked into the folded expansion and deployment part 40. For example, the upper extension panel 52*a* and the lower extension panel 52*b* are respectively folded inward from the root part 42*a* and the exhaust vent part 42 is inserted into the expansion and deployment part 40. The inserted upper extension panel 52*a* and lower extension panel 52*b* are positioned, for example, inside one of the plurality of fold-back parts 64.

According to Embodiments 2 and 3, as in the modified example illustrated in FIG. 3A, structurally, the flow of gas toward the exhaust vent part 42 is suppressed at the initial stage of expansion and deployment of the airbag cushion 32. At the initial stage of deployment, leakage of gas from the exhaust port 46 of the exhaust vent part 42 can be further suppressed.

Figure 11:
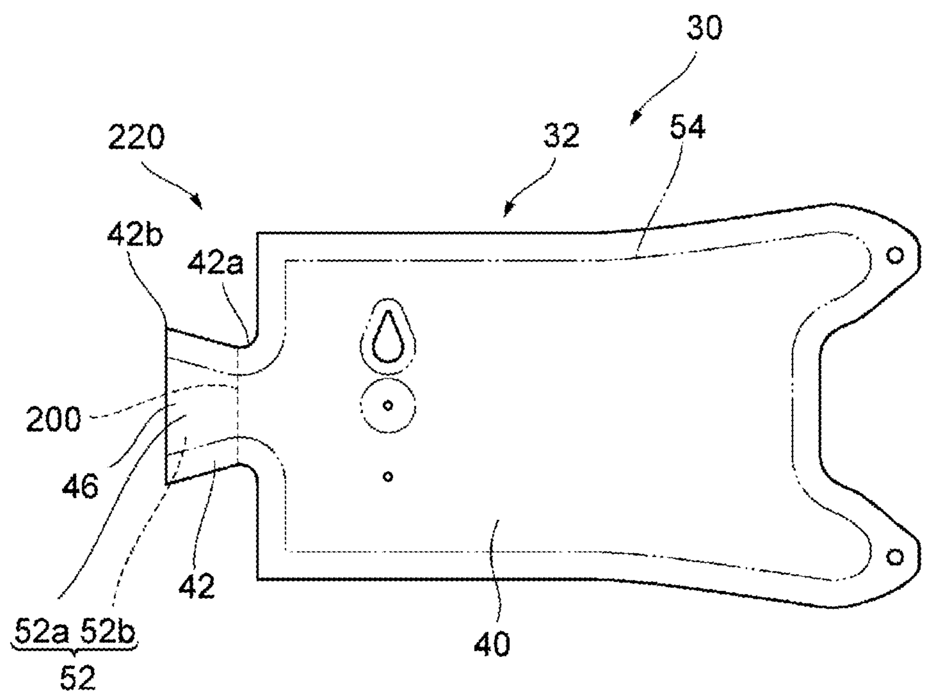
FIG. 11 is a plan view illustrating the airbag cushion of the occupant protection device according to Embodiment 4.

FIG. 11 illustrates the airbag cushion 32 of the occupant protection device 30 according to Embodiment 4. Here, the exhaust vent part 42 is temporarily joined so as to close at least a part of the exhaust port 46, and such temporary joining is released by the expansion and deployment of the expansion and deployment part 40.

For example, the exhaust vent part 42 is temporarily stitched by a temporary suture 200 in the vicinity of the root part 42*a* or between the root part 42*a* and the tip end part 42*b*. The temporary suture 200 sews the upper extension panel 52*a* and the lower extension panel 52*b* together. In a normal state, the temporary suture 200 may completely close the exhaust port 46 or may partially close the exhaust port 46. The suture force of the temporary suture 200 is smaller than the suture force of the seam 54. Therefore, when the expansion and deployment section 40 is expanded and deployed, the temporary suture 200 is cut under the influence of a change in shape or an increase in membrane surface tension by the expansion and deployment part 40. Therefore, according to Embodiment 4 as well, leakage of gas from the exhaust port 46 at the initial stage of expansion and deployment is suppressed, and the initial waist restraint performance can be further increased.

Figure 12:
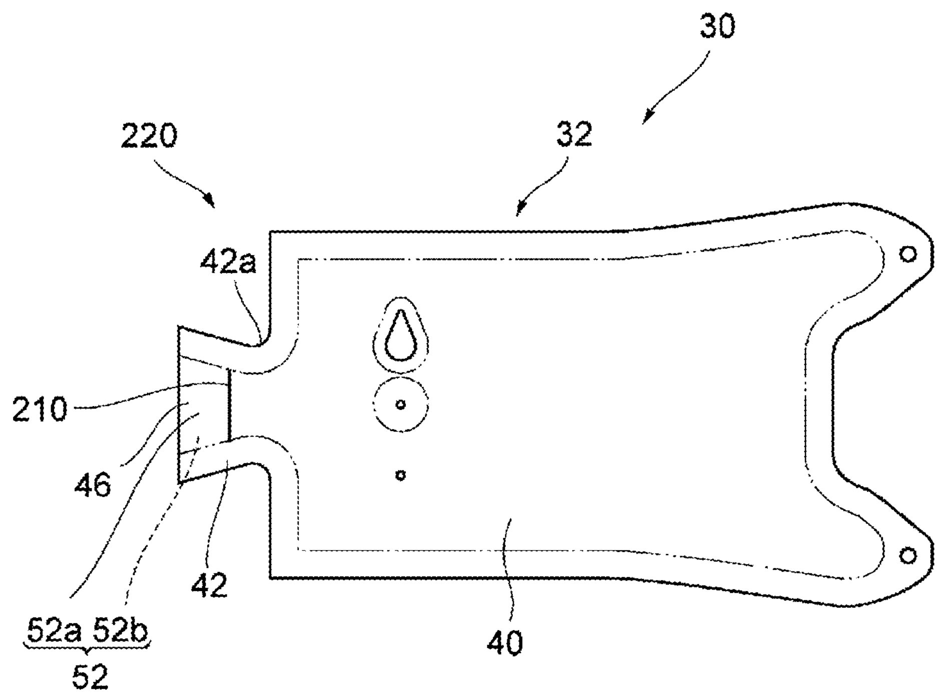
FIG. 12 is a plan view illustrating the airbag cushion of the occupant protection device according to Embodiment 5.

FIG. 12 illustrates the airbag cushion 32 of the occupant protection device 30 according to Embodiment 5. Here, the exhaust vent part 42 includes a closing part 210 that closes the exhaust port 46, and the closing part 210 is configured to be opened by expansion and deployment of the expansion and deployment part 40.

For example, the closing part 210 is formed of a thin membrane member. The closing part 210 is attached between the upper extension panel 52*a* and the lower extension panel 52*b*, and blocks communication between the exhaust vent part 42 and the expansion and deployment part 40. When the expansion and deployment part 40 is expanded and deployed, the closing part 210 breaks under the influence of a change in shape, an increase in membrane surface tension, or an increase in internal pressure caused by the expansion and deployment part 40. When the closing part 210 is broken, the exhaust vent part 42 and the expansion and deployment part 40 communicate with each other. Therefore, according to Embodiment 5 as well, leakage of gas from the exhaust port 46 at the initial stage of expansion and deployment is suppressed, and the initial waist restraint performance can be further increased.

Figure 13:
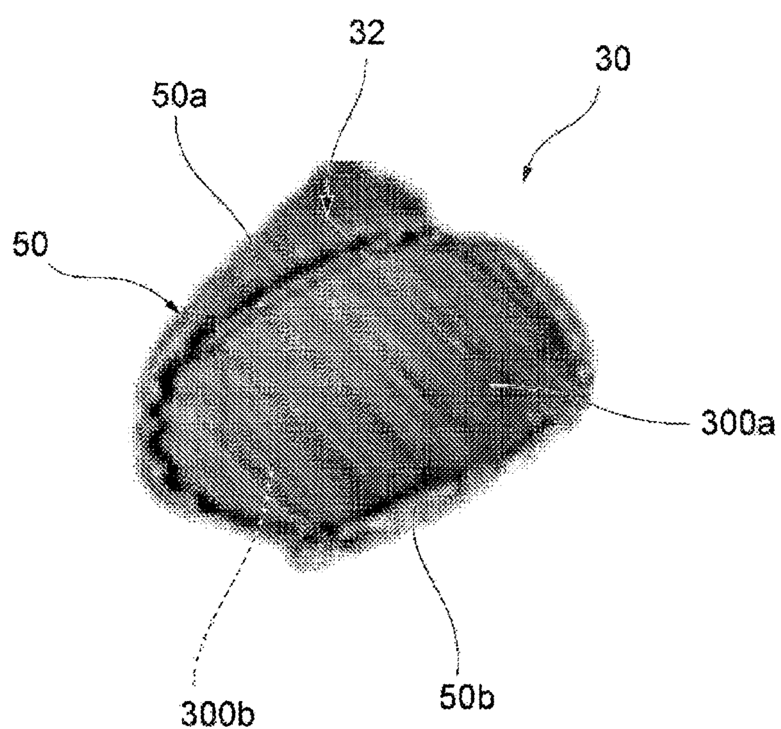
FIG. 13 is a perspective view illustrating the state of the airbag cushion of the occupant protection device according to Embodiment 6 expanded and deployed.
Figures 14A, 14B:
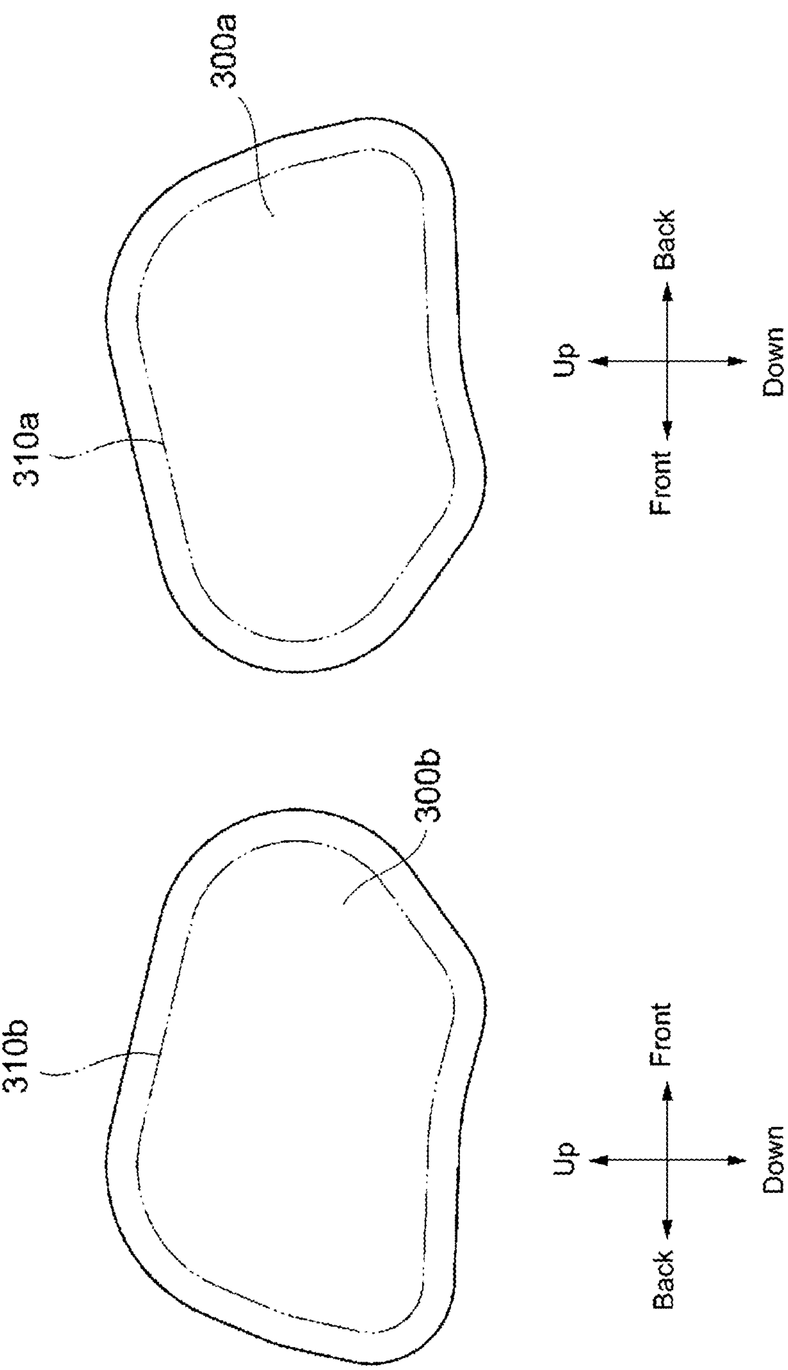
FIG. 14 is a plan view illustrating side panels of the airbag cushion of FIG. 13, wherein (A) illustrates one side panel and (B) illustrates the other side panel.

FIG. 13 and FIG. 14 illustrate the airbag cushion 32 of the occupant protection device 30 according to Embodiment 6. Note that the exhaust vent part 42 is not illustrated. Here, the base fabric panel 50 constituting the expansion and deployment part 40 additionally has side panels 300*a* and 300*b* facing each other in addition to the upper base fabric panel 50*a* and the lower base fabric panel 50*b*. The side panels 300*a* and 300*b* face each other in a direction orthogonal to the up-down direction, and are joined to the upper base fabric panel 50*a* and the lower base fabric panel 50*b*, respectively.

For example, the side panels 300*a* and 300*b* are formed in a paired shape (symmetrical shape), and seam lines 310*a* and 310*b* along the periphery are sewn to the upper base fabric panel 50*a* and to the lower base fabric panel 50*b*. The side panels 300*a* and 300*b* are not associated with (not joined to) the base fabric panel extension part 52 forming the exhaust vent part 42. The side panels 300*a* and 300*b* define the height (cross-sectional shape at the time of deployment) when the airbag cushion 32 is deployed.

The occupant protection device 30 according to Embodiment 6 can also achieve the same effects as the above-described embodiments. In particular, according to the airbag cushion 32 having a 3D (three-dimensional) shape as in Embodiment 6, the overall volume of the airbag cushion can be reduced when compared to a 2D shape as in the above embodiments, while increasing the upward bulge (stroke or thickness).

Figure 15:
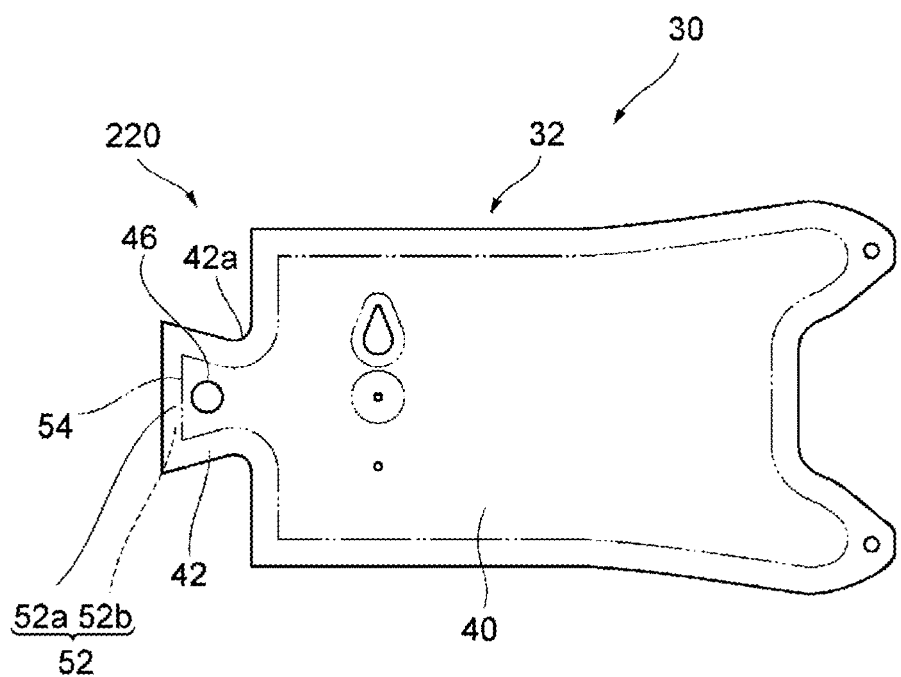
FIG. 15 is a plan view illustrating the airbag cushion of the occupant protection device according to Embodiment 7.

FIG. 15 illustrates the airbag cushion 32 of the occupant protection device 30 according to Embodiment 7. Here, the exhaust port 46 is formed in at least one of the upper extension panel 52*a* and the lower extension panel 52*b*. Therefore, the tip end part 42*b* of the exhaust vent part 42 is sewn and closed by the seam 54. The exhaust port 46 is, for example, a vent hole formed in the upper extension panel 52*a* and is normally open. When the exhaust port 46 is also formed in the lower extension panel 52*b*, the exhaust port 46 may be formed at a position offset from the exhaust port 46 in the upper extension panel 52*a*. The occupant protection device 30 according to Embodiment 7 can also achieve the same effects as the above-described embodiments.

Figure 16:
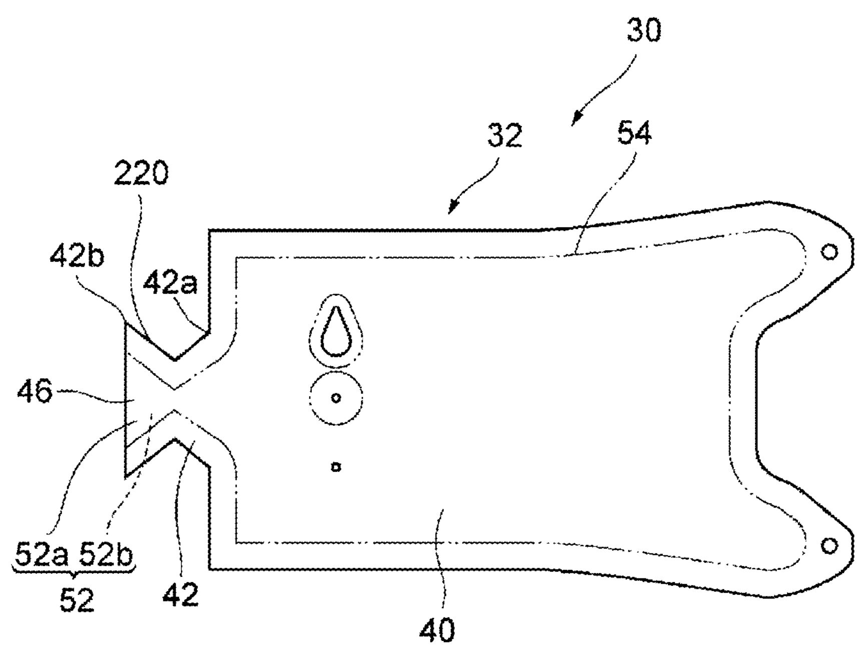
FIG. 16 is a plan view illustrating the airbag cushion of the occupant protection device according to Embodiment 8.

FIG. 16 illustrates the airbag cushion 32 of the occupant protection device 30 according to Embodiment 8. In the above-described embodiments (specifically, the embodiments relating to FIGS. 2, 11, 12, and 15), the constricted structure 220 is provided at an end part of the base fabric panel extension part 52, but in the present embodiment, the constricted structure 220 is provided at an intermediate portion of the base fabric panel extension part 52. To be more specific, the constricted structure 220 has a constricted portion at a portion between the root part 42*a* and the tip end part 42*b* of the exhaust vent part 42, the constricted portion being narrower than both of the root part and tip end part. A plurality of constricted portions may be provided between the root part 42*a* and the tip end part 42*b*.

The embodiments described above are for ease of understanding of the present invention and are not intended to be construed as limiting the present invention. Each element provided in each embodiment and its arrangement, materials, conditions, shape, size, and the like are not limited to those exemplified and can be changed as appropriate, and the configurations of each embodiment can be combined with each other.

In addition, it is also possible to add additional configurations to the above-described embodiment. For example, processing may be performed such that the membrane surface tension increases when the airbag cushion 32 is expanded and deployed. In addition, a process may be performed to increase the close contact nature of the peripheral regions 53 of the exhaust port 46 when the airbag cushion 32 is expanded and deployed. For example, the inner surface of the base fabric panel 50 and/or the base fabric panel extension part 52 may be surface-treated to form a friction surface.

EXPLANATION OF CODES

3. Headrest; 4. Reclining mechanism; 10. Seat frame; 20. Seating frame; 22. Side frame; 24. Seat pan; 26. Seat surface; 30. Occupant protection device; 32, 32', 32". Airbag cushion; 32*a*. Peripheral edge 34. Inflator; 34*a*. Stud bolts; 40. Expansion and deployment part; 42. Exhaust vent part; 42*a*. Root part; 42*b*. Tip end part; 44. Communication point; 46. Exhaust port; 50. Base fabric panel; 50*a*. Upper base fabric panel; 50*b*. Lower base fabric panel; 50*c*. Periphery; 52. Base fabric panel extension part; 52*a*. Upper extension panel; 52*b*. Lower extension panel; 52*c*. Periphery; 53. Peripheral region; 54. Seam; 60. Front attachment point; 62*a*, 62*b*. Rear attachment points; 64. Fold-back part; 70. Fastener; 80, 90, 94, 96. Arrows; 100. Vehicle seat; 105. Lap belt; 107. Occupant; 110. Occupant ilium; 200. Temporary suture; 210. Closing part; 220. Constricted structure; 300*a*, 300*b*. Side panels; 310*a*, 310*b*. Seam lines; F. Load; Y1. Curve; Y2. Curve;

The invention claimed is:

1. An occupant protection device provided inside or below a seat cushion of a vehicle seat, comprising:

an airbag cushion that can be expanded and deployed so as to push up the seat surface of the seat cushion; and an inflator that supplies gas for expanding and deploying to the inside of the airbag cushion during a vehicle emergency, wherein the airbag cushion includes an expansion and deployment part that is expanded and deployed by the gas from the inflator, and an exhaust vent part that protrudes from the peripheral edge of the airbag cushion; and the expanded and deployed airbag cushion is configured such that when a load acts on the expansion and deployment part, the exhaust vent part opens to allow the inside of the expanded and deployed portion to communicate to the outside.

2. The occupant protection device according to claim 1, wherein the load includes reaction force when the expanded and deployed airbag cushion pushes up the seat surface while the occupant is seated on the vehicle seat.

3. The occupant protection device according to claim 1, wherein the airbag cushion has a base fabric panel forming the expansion and deployment part, and a base fabric panel extension part provided continuously from the base fabric panel and forming the exhaust vent part.

4. The occupant protection device according to claim 3, wherein:

the base fabric panel extension part has an upper extension panel and a lower extension panel that face each other in the up-down direction, and includes an exhaust port formed between the upper extension panel and the lower extension panel or formed in at least one of the upper extension panel or lower extension panel; and when the airbag cushion is expanded and deployed, the base fabric panel extension part obstructs the exhaust port by the upper extension panel and lower extension panel closely contacting each other until a load acts on the expansion and deployment part, and as a load acts on the expansion and deployment part, the close contact of the upper extension panel and the lower extension panel is released, opening the exhaust port.

5. The occupant protection device according to claim 4, wherein the base fabric panel has an upper base fabric panel and lower base fabric panel that face each other in the up-down direction, and the upper extension panel is provided continuously from the upper base fabric panel, and the lower extension panel is provided continuously from the lower base fabric panel.

6. The occupant protection device according to claim 5, wherein the base fabric panels further include side panels facing each other in a direction orthogonal to the up-down direction and joined to the upper base fabric panel and lower base fabric panel.

7. The occupant protection device according to claim 3, wherein a tip end part of the base fabric panel extension parts is wider than a root part of the base fabric panel extension parts.

8. The occupant protection device according to claim 3, wherein the airbag cushion has a constricted structure in the middle of the base fabric panel extension part.

9. The occupant protection device according to claim 1, wherein:

the exhaust vent part includes an exhaust port and peripheral region of the exhaust port; and the expanded and deployed airbag cushion obstructs the exhaust port due to the peripheral region coming into close contact with each other until a load acts on the expansion and deployment part, and when a load acts on the expansion and deployment part, the close contact of the peripheral region is released, opening the exhaust port.

10. The occupant protection device according to claim 1, wherein the expansion and deployment part prior to expansion and deployment is in a folded state, where the exhaust vent part is folded so as to overlap with an upper portion of the expansion and deployment part in the folded state.

11. The occupant protection device according to claim 1, wherein the expansion and deployment part prior to expansion and deployment is in a folded state, where the exhaust vent part is tucked into the folded expansion and deployment part.

12. The occupant protection device according to claim 1, wherein the expansion and deployment part prior to expansion and deployment is in a folded state, where the exhaust vent part is interposed between folded layers of the expansion and deployment part in the folded state.

13. The occupant protection device according to claim 9, wherein the exhaust vent part is temporarily joined so as to obstruct at least a part of the exhaust port, and the temporarily joined exhaust vent is released by expansion and deployment of the expansion and deployment part.

14. The occupant protection device according to claim 1, wherein the exhaust vent part is configured such that a root portion on the peripheral side of the airbag cushion is narrower than a tip end part of the exhaust vent part.

15. The occupant protection device according to claim 1, wherein the exhaust vent part is positioned to a front part of the vehicle seat in a front-to-back direction.

* * * * *